(12) United States Patent
Yamada et al.

(10) Patent No.: US 10,065,881 B2
(45) Date of Patent: Sep. 4, 2018

(54) INFRARED TRANSMITTING GLASS

(71) Applicant: NIPPON ELECTRIC GLASS CO., LTD., Otsu-shi, Shiga (JP)

(72) Inventors: Tomoko Yamada, Otsu (JP); Fumio Sato, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

(21) Appl. No.: 15/103,436

(22) PCT Filed: Dec. 16, 2014

(86) PCT No.: PCT/JP2014/083191
§ 371 (c)(1),
(2) Date: Jun. 10, 2016

(87) PCT Pub. No.: WO2015/104958
PCT Pub. Date: Jul. 16, 2015

(65) Prior Publication Data
US 2016/0311719 A1 Oct. 27, 2016

(30) Foreign Application Priority Data
Jan. 9, 2014 (JP) .................. 2014-002118

(51) Int. Cl.
C03C 4/10 (2006.01)
C03C 3/32 (2006.01)
G01J 1/42 (2006.01)
G02B 5/20 (2006.01)
G01J 1/04 (2006.01)

(52) U.S. Cl.
CPC ............... C03C 4/10 (2013.01); C03C 3/321 (2013.01); G01J 1/0437 (2013.01); G01J 1/42 (2013.01); G02B 5/208 (2013.01); C03C 2204/00 (2013.01)

(58) Field of Classification Search
CPC ...... C03C 4/10; C03C 3/32; G01J 1/04; G01J 1/42
USPC .......................................................... 501/40
See application file for complete search history.

(56) References Cited

U.S. PATENT DOCUMENTS

2010/0285946 A1* 11/2010 Tani .................... C03C 3/321
501/40

FOREIGN PATENT DOCUMENTS

| JP | 5-24879 A | 2/1993 |
| JP | 5-85769 A | 4/1993 |
| JP | 08-325032 A | 12/1996 |
| JP | 2009-161374 A | 7/2009 |

OTHER PUBLICATIONS

Official Communication issued in International Patent Application No. PCT/JP2014/083191, dated Mar. 17, 2015.
(Continued)

Primary Examiner — Bijan Ahvazi
(74) Attorney, Agent, or Firm — Keating and Bennett, LLP

(57) ABSTRACT

Provided is a thermally stable and inexpensive infrared transmitting glass. An infrared transmitting glass containing, in % by mole, 0 to 20% Ge (exclusive of 0% and 20%), 0 to 40% Sb (exclusive of 0%), 0 to 20% Bi (exclusive of 0%), and 50 to 80% S+Se+Te.

5 Claims, 1 Drawing Sheet

(56) References Cited

OTHER PUBLICATIONS

Sharma et al., "Far-Inframed Transmission Spectra of Doped Amorphous Germanium Chalcogenide Semiconductors", Journal of Non-Crystalline Solids, vol. 108, Apr. 1988, pp. 309-314.
Adriaenssens et al., "Transient Photocurrents in Bi-Modified Ge2Se7", Journal of Non-Crystalline Solids, vol. 114, Dec. 1, 1989, pp. 100-102.
Official Communication issued in corresponding European Patent Application No. 14878100.8, dated May 18, 2017.

* cited by examiner

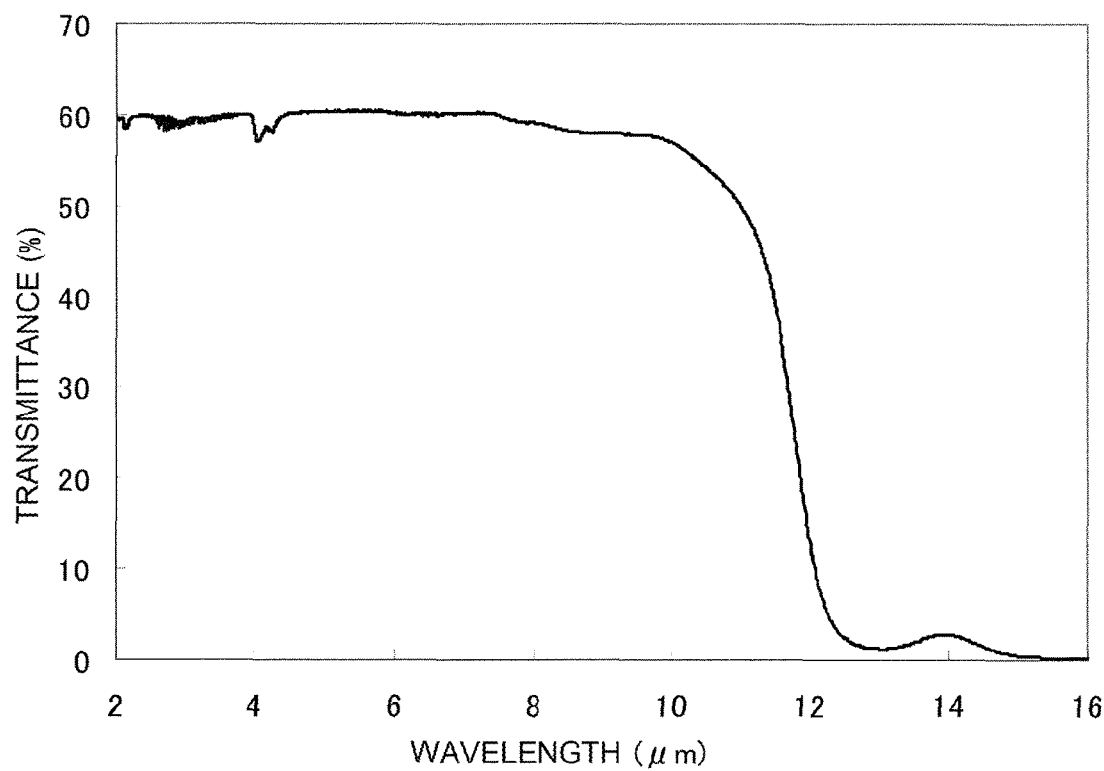

INFRARED TRANSMITTING GLASS

TECHNICAL FIELD

This invention relates to infrared transmitting glasses for use in infrared sensors and so on.

BACKGROUND ART

On-vehicle night vision devices, security systems, and the like include infrared sensors for use to detect living bodies at night. To sense infrared rays with wavelengths of about 8 to 12 μm emitted from living bodies, such an infrared sensor is provided, in front of the sensor section, with an optical element, such as a filter or a lens, capable of transmitting infrared rays in the above wavelength range.

Examples that can be cited as a material for the optical element as described above include Ge and ZnSe. These materials are crystalline and therefore poor in processability, so that they are difficult to process into complicated shapes, such as an aspheric lens. This makes mass production difficult and also presents a problem of difficulty in size reduction of the infrared sensor.

To cope with the above, chalcogenide glasses are proposed as vitreous materials that can transmit infrared rays with wavelengths of about 8 to 12 μm and are relatively easy to process (see, for example, Patent Literature 1 or 2).

CITATION LIST

Patent Literature

[PTL 1]
JP-A-H05-24879
[PTL 2]
JP-A-H05-85769

SUMMARY OF INVENTION

Technical Problem

The glasses described in Patent Literatures 1 and 2 have narrow vitrification ranges and are therefore thermally unstable. In addition, the glasses contain Ge in large amounts, which is disadvantageous in terms of cost.

In view of the above, an object of the present invention is to provide a thermally stable and inexpensive infrared transmitting glass.

Solution to Problem

An infrared transmitting glass according to the present invention contains, in % by mole, 0 to 20% Ge (exclusive of 0% and 20%), 0 to 40% Sb (exclusive of 0%), 0 to 20% Bi (exclusive of 0%), and 50 to 80% S+Se+Te.

The infrared transmitting glass according to the present invention preferably contains, in % by mole, 2 to 20% Ge (exclusive of 20%), 5 to 35% Sb, 1 to 20% Bi, and 55 to 75% S+Se+Te.

The infrared transmitting glass according to the present invention preferably further contains, in % by mole, 0 to 20% Sn.

The infrared transmitting glass according to the present invention is preferably substantially free of As, Cd, Tl, and Pb.

In an infrared transmitting optical element according to the present invention, the above-described infrared transmitting glass is used.

In an infrared sensor according to the present invention, the above-described infrared transmitting optical element is used.

Advantageous Effects of Invention

The present invention can provide a thermally stable and inexpensive infrared transmitting glass.

BRIEF DESCRIPTION OF DRAWINGS

FIG. 1 is a graph showing a light transmittance curve of an infrared transmitting glass produced in Example 1.

DESCRIPTION OF EMBODIMENTS

An infrared transmitting glass according to the present invention contains, in % by mole, 0 to 20% Ge (exclusive of 0% and 20%), 0 to 40% Sb (exclusive of 0%), 0 to 20% Bi (exclusive of 0%), and 50 to 80% S+Se+Te. The reasons why the glass composition is defined as just described will be described below.

Ge is an essential component for forming glass networks. The Ge content is 0 to 20% (exclusive of 0% and 20%), preferably 2 to 20% (exclusive of 20%), more preferably 2 to 18%, and still more preferably 4 to 15%. If the composition is free of Ge, vitrification becomes difficult. On the other hand, if the Ge content is too large, Ge-based crystals will be likely to precipitate and additionally the cost of raw materials tends to be high.

Sb is also an essential component for forming glass networks. The Sb content is 0 to 40% (exclusive of 0%), preferably 5 to 35%, and more preferably 10 to 33%. If the composition is free of Sb or the Sb content is too large, vitrification becomes difficult.

Bi is a component for promoting vitrification. Chalcogenide glass is likely to volatilize S, Se, and Te, which are chalcogen elements, during melting. Therefore, because of heterogeneity due to composition deviation or low reactivity of Ge and Sb with the chalcogen elements, vitrification becomes difficult. To cope with this, in the present invention, Bi is contained in the glass composition in order to promote vitrification. The reason why vitrification can be promoted by the inclusion of Bi in the glass composition is as follows. While Ge and Sb have melting points of 940° C. and 630° C., respectively, Bi has a melting point as low as 270° C. and melts at relatively low temperatures. Therefore, the addition of Bi as a raw material enables the chalcogen elements to react with Bi before they volatilize, so that vitrification can be promoted. In addition, Bi has the effect of improving thermal stability of glass. However, if the Bi content is too large, vitrification becomes difficult. In view of the above, the Bi content is 0 to 20% (exclusive of 0%), preferably 1 to 20%, more preferably 0.5 to 10%, and still more preferably 2 to 8%.

The chalcogen elements S, Se, and Te are components for forming glass networks. The S+Se+Te content (the total amount of S, Se, and Te) is 50 to 80%, preferably 55 to 75%, and more preferably 58 to 68%. If the S+Se+Te content is too small, vitrification becomes difficult. On the other hand, if it is too large, weather resistance may deteriorate.

The preferred chalcogen element to be selected is S from an environmental viewpoint.

The infrared transmitting glass according to the present invention may contain, in addition to the above components, the following components.

Sn is a component that widens the vitrification range and increases thermal stability of glass. The Sn content is preferably 0 to 20% and more preferably 0.5 to 10%. If the Sn content is too large, vitrification becomes difficult.

Zn, In, Ga, and P are components that widen the vitrification range and the content of each of them is preferably 0 to 20%. If the content of each of them is too large, vitrification becomes difficult.

Cl, F, and I are components that widen the range of infrared transmitting wavelengths and the content of each of them is preferably 0 to 20%. If the content of each of them is too large, weather resistance is likely to deteriorate.

The infrared transmitting glass according to the present invention is preferably substantially free of As, Cd, Tl, and Pb which are toxic substances. By doing so, effects on the environment can be minimized. Note that "substantially free of" herein means that no amount of these components are deliberately contained in the raw materials, and is not intended to exclude even the incorporation thereof in impurity level. Objectively, this means that the content of each component is below 1000 ppm.

The infrared transmitting glass according to the present invention has an excellent transmittance for infrared rays with wavelengths of about 8 to 12 µm. As an index for evaluating the transmittance for infrared rays with wavelengths of about 8 to 12 µm, a 50% transmitting wavelength in the infrared region can be cited. The 50% transmitting wavelength (thickness: 2 mm) in the infrared region in the present invention is preferably 10.5 µm or more and more preferably 11 µm or more.

The infrared transmitting glass according to the present invention can be produced, for example, in the following manner. First, raw materials are mixed together to give a desired composition. The raw materials are put into a silica glass ampoule evacuated with application of heat and the silica glass ampoule is then sealed with an oxygen burner while being evacuated. The sealed silica glass ampoule is held at about 650 to about 800° C. for six to twelve hours and then rapidly cooled to obtain an infrared transmitting glass according to the present invention.

Elemental materials (such as Ge, Sb, Bi, and S) may be used as the raw materials or compound materials (such as $GeS_2$, $Sb_2S_3$, and $Bi_2S_3$) may be used instead.

EXAMPLES

Hereinafter, the present invention will be described with reference to examples, but is not limited to the examples.

Tables 1 and 2 show examples of the present invention and comparative examples, respectively.

TABLE 1

|  |  | Examples | | | | |
|---|---|---|---|---|---|---|
|  |  | 1 | 2 | 3 | 4 | 5 |
| Glass | Ge | 8.6 | 5.2 | 10.1 | 6.0 | 7.1 |
| Composition | Sb | 24.7 | 29.1 | 23.3 | 30.1 | 20.2 |
| (% by mole) | Bi | 5.0 | 4.7 | 7.3 | 2.3 | 11.8 |
|  | S | 61.7 | 61.0 | 59.3 | 61.1 | 60.9 |
|  | Sn |  |  |  | 0.5 |  |
| Vitrification |  | ○ | ○ | ○ | ○ | ○ |
| 50% Transmitting Wavelength(µm) |  | 11.2 | 11.6 | 11.4 | 11.5 | 11.4 |

TABLE 2

|  |  | Comparative Examples | | | |
|---|---|---|---|---|---|
|  |  | 1 | 2 | 3 | 4 |
| Glass | Ge |  | 6.8 | 2.0 | 18.0 |
| Composition | Sb | 29.1 | 7.5 | 35.0 |  |
| (% by mole) | Bi | 8.2 | 23.4 |  | 12.0 |
|  | S | 62.7 | 62.3 | 59.0 | 70.0 |
|  | Sn |  |  | 4.0 |  |
| Vitrification |  | x | x | x | x |
| 50% Transmitting Wavelength (µm) |  | No Transmission | No Transmission | No Transmission | No Transmission |

Each sample was prepared in the following manner. Ge, Sb, Bi, S, and Sn were mixed to give a desired composition ratio, thus obtaining a raw material batch. A silica glass ampoule cleaned with pure water was evacuated with application of heat, the raw material batch was then put into the silica glass ampoule, and the silica glass ampoule was sealed with an oxygen burner while being evacuated.

The sealed silica glass ampoule was raised in temperature to 650 to 800° C. in a melting furnace at a rate of 10° C. to 20° C./hour and then held for six to twelve hours. During the holding time, the silica glass ampoule was turned upside down every two hours to stir the melt. Thereafter, the silica glass ampoule was taken out of the melting furnace and rapidly cooled to room temperature, thus obtaining a sample.

The obtained samples were subjected to differential thermal analysis to confirm whether they were vitrified based on the presence or absence of a glass transition point. In the tables, vitrified samples are indicated by "open circle" and unvitrified samples are indicated by "cross". Furthermore, each sample was measured in terms of light transmittance at a thickness of 2 mm and measured in terms of 50% transmitting wavelength in an infrared region of around 8 to 12 µm. FIG. 1 shows the light transmittance curve of the sample of Example 1.

As shown in Table 1, the samples of Examples 1 to 5 were vitrified and had 50% transmitting wavelengths ranging from 11.2 to 11.6 µm, and the samples exhibited excellent light transmittance in an infrared region of around 8 to 12 µm.

In contrast, the samples of Comparative Examples 1 to 4 were not vitrified and their light transmittances were approximately 0% in a wavelength range of 2 to 20 µm.

INDUSTRIAL APPLICABILITY

The infrared transmitting glass according to the present invention is suitable as an infrared transmitting optical element for use in an infrared sensor or other applications.

The invention claimed is:

1. An infrared transmitting glass containing, in % by mole, more than 0% and not more than 18% Ge, 5 to 40% Sb, 1 to 20% Bi, 50 to 80% S+Se+Te, 0 to 0.5% Sn, and 0% Zn.

2. The infrared transmitting glass according to claim 1, containing, in % by mole, not less than 2% and not more than 18% Ge, 5 to 35% Sb, and 55 to 75% S+Se+Te.

3. The infrared transmitting glass according to claim 1, the infrared transmitting glass being substantially free of As, Cd, Tl, and Pb.

4. An infrared transmitting optical element wherein the infrared transmitting glass according to claim 1 is used.

5. An infrared sensor wherein the infrared transmitting optical element according to claim 4 is used.

* * * * *